(12) United States Patent
Kim et al.

(10) Patent No.: US 9,057,910 B2
(45) Date of Patent: Jun. 16, 2015

(54) DISPLAY PANEL, DISPLAY APPARATUS HAVING THE SAME AND METHOD OF MANUFACTURING THE SAME

(71) Applicant: Samsung Display Co., Ltd., Yongin (KR)

(72) Inventors: Min-Su Kim, Seoul (KR); Seung-Beom Park, Seoul (KR); Kwang-Hyun Kim, Gunpo-si (KR); Ji-Hoon Kim, Hwaseong-si (KR); Gwan-Young Na, Osan-si (KR); Beong-hun Beon, Hwaseong-si (KR); Na-Young Shin, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 196 days.

(21) Appl. No.: 13/734,262

(22) Filed: Jan. 4, 2013

(65) Prior Publication Data

US 2013/0329169 A1   Dec. 12, 2013

(30) Foreign Application Priority Data

Jun. 8, 2012 (KR) .......................... 10-2012-0061342

(51) Int. Cl.
| | | |
|---|---|---|
| G02F 1/1339 | (2006.01) | |
| G02F 1/1335 | (2006.01) | |
| G02F 1/1333 | (2006.01) | |
| G02F 1/1362 | (2006.01) | |

(52) U.S. Cl.
CPC ........ *G02F 1/133528* (2013.01); *G02F 1/1333* (2013.01); *G02F 1/133377* (2013.01); *G02F 2001/136222* (2013.01)

(58) Field of Classification Search
USPC .................................. 349/58, 43, 96, 156, 86
See application file for complete search history.

(56) References Cited

U.S. PATENT DOCUMENTS

| | | | | |
|---|---|---|---|---|
| 4,653,864 | A * | 3/1987 | Baron et al. .................. | 349/156 |
| 5,608,555 | A * | 3/1997 | Onishi et al. .................. | 349/156 |
| 5,627,665 | A * | 5/1997 | Yamada et al. ............... | 349/156 |
| 7,123,319 | B2 | 10/2006 | Broer et al. | |
| 8,018,558 | B2 * | 9/2011 | Kubota et al. ................. | 349/122 |
| 8,203,677 | B2 * | 6/2012 | Sakai ............................ | 349/127 |
| 8,325,290 | B2 * | 12/2012 | Bae et al. ....................... | 349/58 |
| 8,558,968 | B2 * | 10/2013 | Oohira .......................... | 349/62 |
| 8,717,518 | B2 * | 5/2014 | Kim et al. ...................... | 349/96 |
| 8,885,135 | B2 * | 11/2014 | Park .............................. | 349/155 |

FOREIGN PATENT DOCUMENTS

| | | |
|---|---|---|
| JP | 2011-060604 | 3/2011 |
| KR | 10-2003-0063656 | 7/2003 |

\* cited by examiner

*Primary Examiner* — James Dudek
(74) *Attorney, Agent, or Firm* — H.C. Park & Associates, PLC (57) ABSTRACT

A display panel including a substrate on which a switching element is disposed, a first electrode connected to the switching element, an image displaying layer disposed under the first electrode, a second electrode disposed under the image displaying layer and insulated from the first electrode, a protective layer disposed under the second electrode and surrounding a lower surface and side surfaces of the image displaying layer, and an upper polarizing plate disposed on the substrate, and making contact with the substrate.

17 Claims, 7 Drawing Sheets

DISPLAY PANEL, DISPLAY APPARATUS HAVING THE SAME AND METHOD OF MANUFACTURING THE SAME

CROSS-REFERENCE TO RELATED APPLICATION

This application claims priority from and the benefit of Korean Patent Application No. 10-2012-0061342, filed on Jun. 8, 2012, which is hereby incorporated by reference for all purposes as if fully set forth herein.

BACKGROUND

1. Field

Exemplary embodiments of the present invention relate to a display panel, a display apparatus having the display panel, and a method of manufacturing the display panel.

More particularly, exemplary embodiments of the present invention relate to a display panel having one substrate, a display apparatus having the display panel, and a method of is manufacturing the display panel.

2. Discussion of the Background

A liquid display apparatus applies a voltage to a specific molecular arrangement configured to change the molecular arrangement. The liquid display apparatus displays an image using changes of an optical property (for example, birefringence, rotatory polarization, dichroism, and light scattering) of a liquid crystal cell according to the changes of the molecular arrangement.

Generally, the liquid display apparatus includes a liquid crystal layer disposed between two substrates. The liquid crystal layer is formed by injecting liquid crystal material between the two substrates. However, the liquid display apparatus includes the two substrates, so that the weight of the liquid display apparatus may be increased and the manufacturing cost of the liquid display apparatus may be increased.

In addition, a liquid display apparatus including only one substrate may exhibit difficulty in rework such as attaching a polarizing plate to a display panel.

SUMMARY

Exemplary embodiments of the present invention provide a display panel having only one substrate capable of easy reworking of upper and lower polarizing plates, and capable of improving a strength of the display panel.

Exemplary embodiments of the present invention also provide a display apparatus having the display panel.

Exemplary embodiments of the present invention also provide a method of manufacturing the display apparatus.

Additional features of the invention will be set forth in the description which follows, and in part will be apparent from the description, or may be learned by practice of the invention.

An exemplary embodiment of the present invention discloses a display panel including a substrate on which a thin film transistor is disposed, a first electrode connected to the thin film transistor, an image displaying layer disposed under the first electrode, a second electrode disposed under the image displaying layer and insulated from the first electrode, a protective layer disposed under the second electrode and surrounding lower and side surfaces of the image displaying layer, and an upper polarizing plate disposed on the substrate, the upper polarizing plate making contact with the substrate.

An exemplary embodiment of the present invention also discloses a display apparatus comprising a display panel, a mold frame for receiving the display panel and a receiving container for receiving the display panel and the mold frame. The display panel includes a substrate on which a thin film transistor is disposed, a first electrode connected to the thin film transistor, an image displaying layer disposed under the first electrode, a second electrode disposed under the image displaying layer and insulated from the first electrode, a protective layer disposed under the second electrode and surrounding a lower surface and side surfaces of the image displaying layer; and an upper polarizing plate disposed on the substrate, the upper polarizing plate making contact with the substrate.

An exemplary embodiment of the present invention also discloses a method of manufacturing a display apparatus comprising forming a first electrode on a substrate on which a thin film transistor is disposed, forming a sacrificial layer on the first electrode, forming a second electrode on the sacrificial layer, forming a tunnel-shaped cavity between the first electrode and is the second electrode by removing the sacrificial layer, forming an image displaying layer in the tunnel-shaped cavity, and attaching an upper polarizing plate on the substrate, the upper polarizing plate disposed opposite the image displaying layer with respect to the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, Z (e.g., XYZ, XYY, YZ, ZZ).

Figure 1:
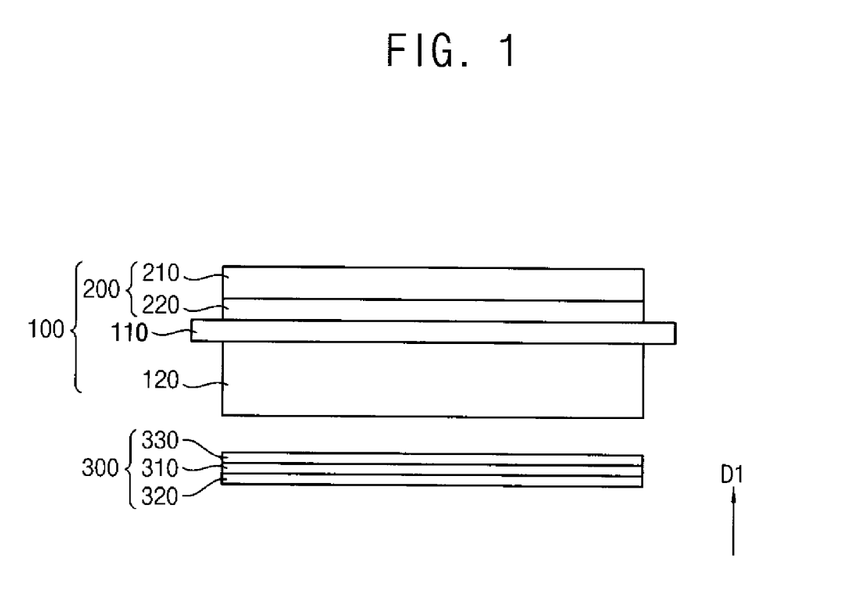
FIG. 1 is a cross-sectional view illustrating a display panel according to an exemplary embodiment of the present invention.

FIG. 1 is a cross-sectional view illustrating a display panel 100 according to an exemplary embodiment of the present invention.

Referring to FIG. 1, the display panel 100 includes a substrate 110, embedded microcavity (EM) layer 120, an upper polarizing plate 200, and a lower polarizing plate 300.

The EM layer 120 is disposed under the substrate 110. Thus, the EM layer 120 is disposed in a direction opposite a first direction D1 with respect to the substrate 110. The substrate 110 is larger than the EM layer 120 in a plan view. A detailed description of the substrate 110 and the EM layer 120 will be provided later with reference to FIG. 4.

The upper polarizing plate 200 is disposed on the substrate 110. The upper polarizing plate 200 includes an upper polarizing layer 210 and attachable-detachable layer 220 disposed between the upper polarizing layer 210 and the substrate 110.

The upper polarizing layer 210 converts a light passing through the upper polarizing layer 210 into a polarized light. Although not shown in figures, the upper polarizing layer 210 may include a retardation layer retarding a phase of the light, a protecting film, etc. The upper polarizing layer 210 may include a polymer, such as polycarbonate, polystyrene, polyvinyl alcohol, poly methyl methacrylate, polypropylene, polyolefine, polyacrylate, polyamide, etc.

The attachable-detachable layer 220 is disposed between the substrate 110 and the upper polarizing layer 210, so that the upper polarizing layer 210 is attached to the substrate 110 via the attachable-detachable layer 220. Although defects may occur while the upper polarizing layer 210 is attached to the substrate 110, the upper polarizing layer 210 may be easily detached from the substrate 110 for reworking. The attachable-detachable layer 220 may include a pressure sensitive adhesive. Thus, the attachable-detachable layer 220 may have a film shape and may be attached to the substrate 110 by pressing the attachable-detachable layer 220. Examples of a material that can be used for the pressure sensitive adhesive include acrylic rubber adhesive having a reflective index about 1.46 to 1.52, and a particulate such as zirconia to is adjusting the reflective index.

The upper polarizing plate 200 is attached to the substrate 110, so that the EM layer 120 may not be damaged whenever the upper polarizing plate 200 is detached from the substrate 110. Thus, the upper polarizing plate 200 may be easily detached from the substrate 110 for reworking. The upper polarizing plate 200 is disposed toward a user with respect to the substrate 110.

The lower polarizing plate 300 is disposed under the EM layer 120. Thus, the lower polarizing plate 300 is disposed in a direction opposite the first direction D1 with respect to the EM layer 120. The lower polarizing plate 300 is spaced apart from the EM layer 120.

The lower polarizing plate 300 includes a lower polarizing layer 310, a first reinforcing layer 320, and a second reinforcing layer 330.

The lower polarizing layer 310 converts a light passing through the lower polarizing layer 310 into a polarized light. Although not shown in figures, the lower polarizing layer 310 may include a retardation layer retarding a phase of the light, a protecting film, etc.

The upper polarizing layer 210 may include a polymer, such as polycarbonate, polystyrene, polyvinyl alcohol, poly methyl methacrylate, polypropylene, polyolefine, polyacrylate, polyamide, etc.

The first reinforcing layer 320 is disposed under the lower polarizing layer 310. Thus, the first reinforcing layer 320 is disposed in a direction opposite the first direction D1 with respect to the lower polarizing layer 310. The first reinforcing layer 320 is arranged under the lower polarizing layer 310 to improve a flatness of the lower polarizing layer 310. The first reinforcing layer 320 may include one or more of tri-acetyl cellulose, polycarbonate, poly propylene, olefin polymer, cyclo olefin polymer, and PMMA (poly methyl methacrylate), but the is present invention is not limited thereto. The first reinforcing layer 320 may have a thickness of about 20 μm to about 300 μm, so that the first reinforcing layer 320 may have sufficient strength.

The second reinforcing layer 330 is disposed on the lower polarizing layer 310. Thus, the second reinforcing layer 330 is disposed in the first direction D1 with respect to the lower polarizing layer 310. The second reinforcing layer 330 is arranged on the lower polarizing layer 310 to improve a flatness of the lower polarizing layer 310. The second reinforcing layer 330 may include one or more of tri-acetyl cellulose, polycarbonate, poly propylene, olefin polymer, cyclo olefin polymer, and PMMA (poly methyl methacrylate), but the present invention is not limited thereto. The second reinforcing layer 330 may have a thickness of about 20 μm to about 300 μm, so that the second reinforcing layer 330 may have sufficient strength. The lower polarizing plate 300 includes the first and second reinforcing layer 320 and 330, so that the lower polarizing plate 300 may be thicker than a conventional polarizing plate. Thus, the lower polarizing plate 300 is less susceptible to deformation caused by external environment than a conventional polarizing plate.

Figure 2:
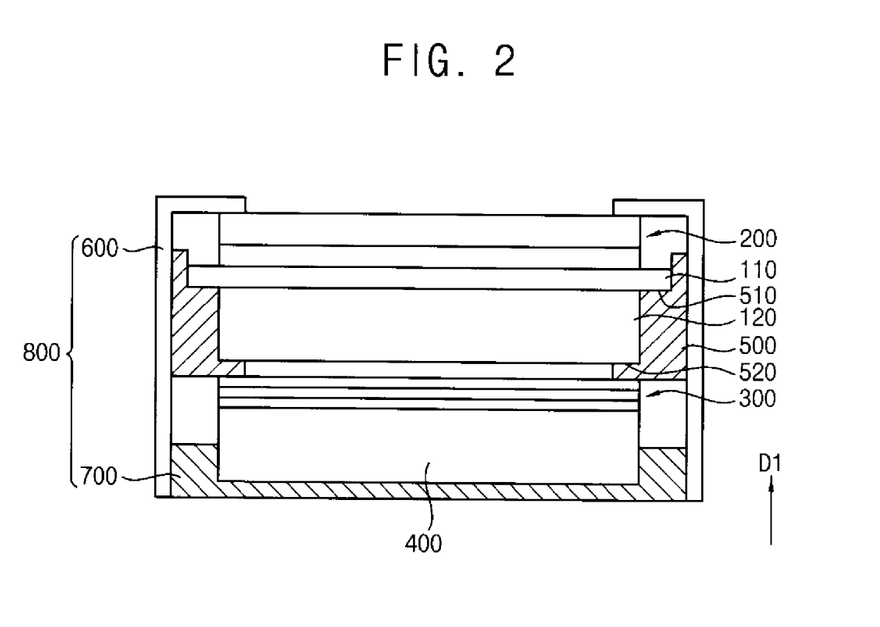
FIG. 2 is a cross-sectional view illustrating a display apparatus according to an exemplary embodiment of the present invention.

The lower polarizing plate 300 is spaced apart from the EM layer 120, so that the EM layer 120 may be protected from external shocks. The lower polarizing plate 300 may be spaced apart by a mold frame 500, as shown in FIG. 2. In addition, the lower polarizing plate 300 may be disposed on a backlight assembly 400, as shown in FIG. 2, and spaced apart from the EM layer 120. In addition, the lower polarizing plate 300 may be disposed on an optical sheet (not shown) disposed on the backlight assembly 400, and spaced apart from the EM layer 120.

FIG. 2 is a cross-sectional view illustrating a display apparatus according to an exemplary embodiment of the present invention.

Referring to FIG. 2, the display apparatus includes a substrate 110, an EM layer 120, an upper polarizing plate 200, a lower polarizing plate 300, a backlight assembly 400, a mold frame 500, and a receiving container 800. The receiving container 800 may include an upper receiving container 600 and a lower receiving container 700.

The substrate 110, the EM layer 120, the upper polarizing plate 200, and the lower polarizing plate 300 are substantially the same elements of the display panel 100 shown in FIG. 1.

Thus, the same reference numerals will be used to refer to the same or like parts as those described in FIG. 1, and any further explanation will be omitted.

The backlight assembly 400 generates a light to supply the light to the display panel 100. The backlight assembly 400 includes one or more optical sheets, a light guiding plate, a light source assembly and a light source driving part. The light source assembly may include a spot light source and a line light source including a plurality of LEDs (light emitting diode).

The optical sheet may include a plurality of sheets (not shown). For example, the optical sheet may include a protection sheet, a prism sheet and a diffusion sheet. Alternatively, the optical sheet may include various kinds of sheets. Many modifications of the optical sheet may be possible.

The light guiding plate converts an incident light having a light distribution of the spot light source or the line light source to an exiting light having a light distribution of a surface light source. Thus, the light guiding plate guides the light from the light source assembly toward the display panel 100. The light source driving part drives the light source assembly. A light reflecting plate may be disposed under the light guiding plate. The light reflecting plate reflects a light exiting under the light guiding plate toward the display panel 100, so that light efficiency of the display apparatus may be improved.

The lower polarizing plate 300 is disposed between the backlight assembly 400 and the EM layer 120, and spaced apart from the EM layer 120. According to the present exemplary embodiment, the lower polarizing plate 300 is disposed on the backlight assembly 400. In addition, the lower polarizing plate 300 may be disposed on top of other optical sheets, so that the lower polarizing plate 300 may be one of the optical sheets The lower polarizing plate 300 may include a reflective-type polarizing plate. The reflective-type polarizing plate passes a portion of light which is polarized in a specific direction through the reflective-type polarizing plate, and rest of the light is reflected. Thus, the reflective-type polarizing plate may polarize about 100% of the light from the backlight assembly, so that the reflective-type polarizing plate may improve light efficiency. The reflective-type polarizing plate may include a plurality of films (not shown). For example, the reflective-type polarizing plate may include a cholesteric liquid crystal and a ¼ wavelength film. Thus, the reflective-type polarizing plate is thicker and stronger than a conventional polarizing plate, so that the reflective-type polarizing plate may be less susceptible to deformation caused by the external environment than a conventional polarizing plate.

The mold frame 500 supports the substrate 110 and the EM layer 120. The mold frame 500 includes a first supporting portion 510, and a second supporting portion 520.

The first supporting portion 510 supports the substrate 110. The substrate 110 is larger than the EM layer 120 in a plan view, so that boundaries of the substrate 110 may be disposed on the first supporting portion 510.

The second supporting portion 520 is disposed under the first supporting portion 510. Thus, the second supporting portion 520 is disposed in a first direction D1 with respect to the first supporting portion 510. The second supporting portion 520 supports the EM layer 120. The EM layer 120 is smaller than the substrate 110 in a plan view, so that boundaries of the EM layer 120 may be disposed on the second supporting portion 520 to be supported by the second supporting portion 520. The mold frame 500 has an opening in its center, so that light from the backlight assembly 400 may be guided toward the display panel 100.

The upper receiving container 600 and the lower receiving container 700 receive the display panel 100, the mold frame 500 and the backlight assembly 400.

Figure 3:
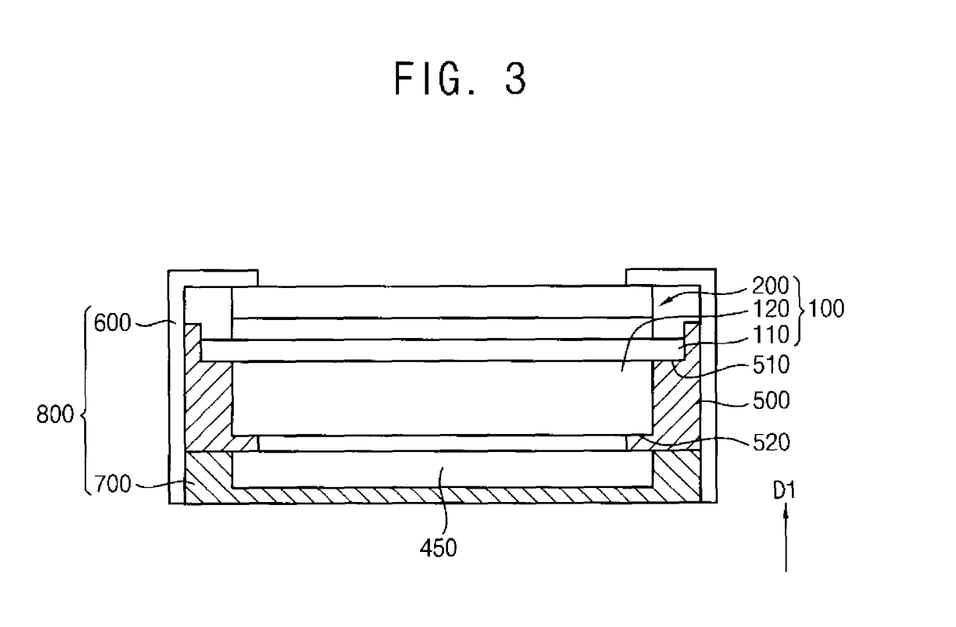
FIG. 3 is a cross-sectional view illustrating a display apparatus according to another exemplary embodiment of the present invention.

FIG. 3 is a cross-sectional view illustrating a display apparatus according to another exemplary embodiment of the present invention.

Referring to FIG. 3, except for the display apparatus further including a reflecting plate 450 and omitting a backlight assembly and a lower polarizing plate 300, the display apparatus is substantially same as the display apparatus of FIG. 2. Thus, the same reference numerals will be used to refer to the same or like parts as those described in FIG. 2, and any further explanation will be omitted.

The display apparatus includes a display panel 100, the reflecting plate 450, a mold frame 500 and a receiving container 800. The display panel 100 includes a substrate 110, a EM layer 120, and an upper polarizing plate 200. The receiving container 800 may include an upper receiving container 600 and a lower receiving container 700.

The EM layer 120 is disposed under the substrate 110. Thus, the EM layer 120 is disposed in a direction opposite a first direction D1 with respect to the substrate 110. The substrate 110 is larger than the EM layer 120 in a plan view.

The upper polarizing plate 200 is disposed on the substrate 110. The upper polarizing plate 200 includes an attachable-detachable layer 220 disposed between the upper polarizing layer 210 and the substrate 110.

The reflecting plate 450 is disposed under the EM layer 120. The reflecting plate 450 is spaced apart from the EM layer 120. The reflecting plate 450 reflects a light from outside through the display panel 100 back toward the display panel 100. Thus, the display apparatus may display an image without a backlight assembly using the light from outside. The reflecting plate 450 may include a metal such as aluminum to improve reflectivity, and may have an embossing pattern for producing scattered reflection.

The mold frame 500 supports the substrate 110 and the EM layer 120. The mold frame 500 includes a first supporting portion 510, and a second supporting portion 520.

The EM layer 120 and the reflecting plate 450 may be spaced apart from each other by the mold frame 500.

The first supporting portion 510 supports the substrate 110. The substrate 110 is larger than the EM layer 120 in a plan view, so that boundaries of the substrate 110 may be disposed on the first supporting portion 510.

The second supporting portion 520 is disposed under the first supporting portion 510. Thus, the second supporting portion 520 is disposed in a first direction D1 with respect to the first supporting portion 510. The second supporting portion 520 supports the EM layer 120. The EM layer 120 is smaller than the substrate 110 in a plan view, so that the boundaries of the EM layer 120 may be disposed on the second supporting portion 520 to be supported by the second supporting portion 520. The mold frame 500 has an opening in a center of mold frame 500, so that light from the reflecting plate 450 may be guided toward the display panel 100.

The upper receiving container 600 and the lower receiving container 700 receive the display panel 100, the reflecting plate 450 and the mold frame 500.

Figure 4:
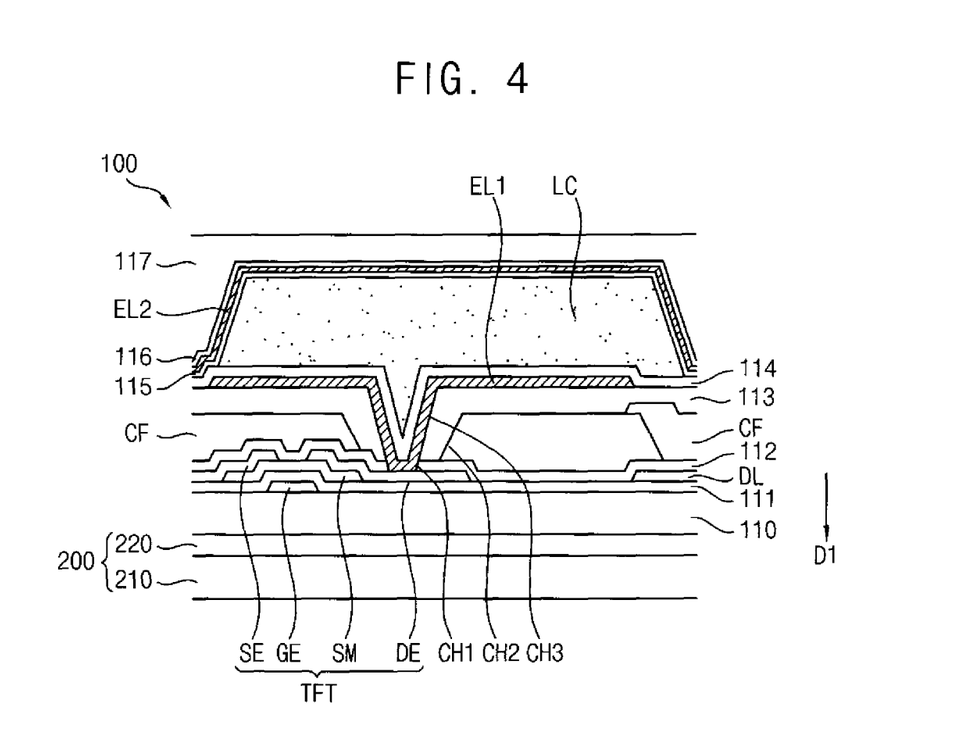
FIG. 4 is a cross-sectional view illustrating the display panel of FIG. 1 in a detailed explanation of an embedded microcavity (EM) layer.

FIG. 4 is a cross-sectional view illustrating the display panel 100 of FIG. 1 for is detailed explanation of embedded microcavity (EM) layer.

Referring to FIG. 4, the display panel 100 includes a substrate 110, a thin film transistor TFT, a gate insulating layer 111, a data insulating layer 112, a color filter CF, a first insulating layer 113, a first electrode EL1, a second insulating layer 114, an image displaying layer LC, a third insulating layer 115, a second electrode EL2, a fourth insulating layer 116, and a protective layer 117. A first direction D1 is illustrated in an opposite direction comparing to that of FIGS. 1 and 2 for convenience of description.

The substrate 110 may be a transparent insulation substrate. For example, the substrate 110 may be a glass substrate or a transparent plastic substrate. The substrate 110 includes a plurality of pixel areas (not shown). Although only one pixel area is shown in the figures, the display panel 100 according to the exemplary embodiments of the present invention includes a plurality of pixels formed in a plurality of pixel areas. The pixel area is arrayed in a matrix structure having a plurality of rows and columns. The pixel areas have same structure each other, so that only one pixel area will be described herein after. Although the pixel area has a rectangular shape in the figures, the pixel area may have various other shapes. For example, the pixel area may have a "V" or "Z" shape.

A gate electrode GE of the thin film transistor TFT is disposed on the substrate 110, and connected to a gate line (not shown).

The gate insulating layer 111 is disposed on the gate line and the gate electrode GE of the thin film transistor TFT.

A semiconductor pattern SM of the thin film transistor TFT is disposed on the gate insulating layer 111 and overlaps with the gate electrode GE.

A source electrode SE is disposed on the semiconductor pattern SM, and connected to the data line DL.

The drain electrode DE of the thin film transistor TFT is disposed on the semiconductor pattern SM and the gate insulating layer 111.

The thin film transistor TFT includes the gate electrode GE, the source electrode SE, the drain electrode DE and the semiconductor pattern SM. The thin film transistor TFT, the gate line, and the data line DL may include a metal oxide which has relatively low surface reflectance. For example, the thin film transistor, the gate line, and the data line DL may include chromium oxide (Cr-oxide). Thus, although a user located in the first direction D1 with respect to the substrate 110 sees the substrate 110, the user cannot recognize patterns of the thin film transistor TFT, the gate line and the data line DL.

The drain electrode DE is disposed on the semiconductor pattern SM, and spaced apart from the source electrode SE. The semiconductor pattern SM forms a conductive channel between the source electrode SE and the drain electrode DE.

The data insulating layer 112 is disposed on the thin film transistor and the data line DL. A first contact hole CH1 is formed through the data insulating layer 112. The first contact hole CH1 overlaps a portion of the drain electrode DE. Thus, the first contact hole CH1 exposes a portion of the drain electrode DE.

The color filter CF is disposed on the data insulating layer 112. A second contact hole CH2 is formed through the color filter CF. The second contact hole CH2 overlaps the portion of the drain electrode DE and the first contact hole CH1.

The color filter CF supplies colors to a light passing through the image displaying layer LC. The color filter CF may include a red color filter, a green color filter, and blue color filter. The color filter CF corresponds to a pixel area. The color filters adjacent to each other may have different colors. In addition, the color filter CF may overlap an adjacent color filter CF in a boundary of the pixel area.

Although the display panel 100 includes the color filter CF in the present exemplary embodiment, the display panel 100 may have various modifications.

The second insulating layer 114 is disposed on the color filter CF. A third contact hole CH3 is formed through the first insulating layer 113. The third contact hole CH3 overlaps the portion of the drain electrode DE, the first contact hole CH1, and second contact hole CH2.

The first electrode EL1 is disposed on the first insulating layer 113. The first electrode EL1 is connected to the drain electrode DE through the first contact hole CH1, the second contact hole CH2, and the third contact hole CH3. The first electrode EL1 covers almost all of the pixel area. The first electrode EL1 may have an approximately rectangular shape, or a shape having a plurality of stems and a plurality of branches protruded from the stems.

The second insulating layer 114 is disposed on the first electrode EL1.

The image displaying layer LC is disposed on the second insulating layer 114. The image displaying layer LC may be a liquid crystal layer.

The third insulating layer 115 is disposed on the image displaying layer LC.

An alignment layer (not shown) may be disposed between the second insulating layer 114 and the image displaying layer LC. The alignment layer may be disposed between the third insulating layer 115 and the image displaying layer LC. The alignment layer pre-tilts the liquid crystal of the image displaying layer LC. However, the alignment layer may be eliminated according to a type of the image displaying layer LC, or a structure of the first electrode EL1 and second electrode EL2. For example, when the first electrode EL1 has micro-silts, so that the image displaying layer LC may be aligned without an additional alignment layer, then the alignment layer may be eliminated. In addition, when the display panel 100 includes a reactive-mesogen layer for initial alignment of the image displaying layer LC, then the alignment layer may be eliminated.

The second electrode EL2 is disposed on the third insulating layer 115. The second electrode EL2 and the first electrode EL1 form an electric field between the first electrode EL1 and the second electrode EL2. A portion of the third insulating layer 115 is spaced apart from the second insulating layer 114, so that a tunnel-shaped cavity is formed between the second insulating layer 114 and the third insulating layer 115. The image displaying layer LC is disposed in the tunnel-shaped cavity. Although the image displaying layer LC may be the liquid crystal layer in the present exemplary embodiment, an image displaying layer for displaying an image may be disposed in the tunnel-shaped cavity. For example, an electrophoresis layer may be disposed in the tunnel-shaped cavity.

The image displaying layer LC may include liquid crystal molecules having optical anisotropy. The liquid crystal molecules are driven by an electric field, so that an image is displayed by passing or blocking light through the image displaying layer LC.

When the electrophoresis layer is disposed in the tunnel-shaped cavity, the electrophoresis layer includes an insulative medium and charge carriers. The insulative medium is a dispersion medium of the dispersed charge carriers. The charge carriers have electrophoresis and are diffused in the insulative medium. The charge carriers move by the electric field, so that an image is displayed by passing or blocking light through the electrophoresis layer.

The fourth insulating layer 116 is disposed on the second electrodes EL2.

The protective layer 117 is disposed on the fourth insulating layer 116. The protective layer 117 includes semi-hardening macromolecule material. The macromolecule material may have liquidity before hardening. The semi-hardening macromolecule material is formed to have a flat shape. The flat shaped semi-hardening macromolecule material is then disposed on the display panel 100 and pressed to form the protective layer 117. The semi-hardening macromolecule material may be supplied to a recessed portion of the display panel 100 as a result of the liquidity.

The upper polarizing plate 200 is disposed under the substrate 110. Thus, the upper polarizing plate 200 is disposed in the first direction D1 with respect to the substrate 110.

The upper polarizing plate 200 includes the upper polarizing layer 210, and the attachable-detachable layer 220 disposed between the upper polarizing layer 210 and the substrate 110 so that the upper polarizing layer 210 is attached to the substrate 110.

FIG. 5A, FIG. 5B, FIG. 5C, FIG. 5D, FIG. 5E, and FIG. 5F are cross-sectional views illustrating a method of manufacturing a display panel 100 according to an exemplary embodiment of the present invention.

The display panel 100 is substantially the same as the display panel 100 in FIG. 1 and FIG. 4, so that any further explanation will be omitted.

Figure 5A:
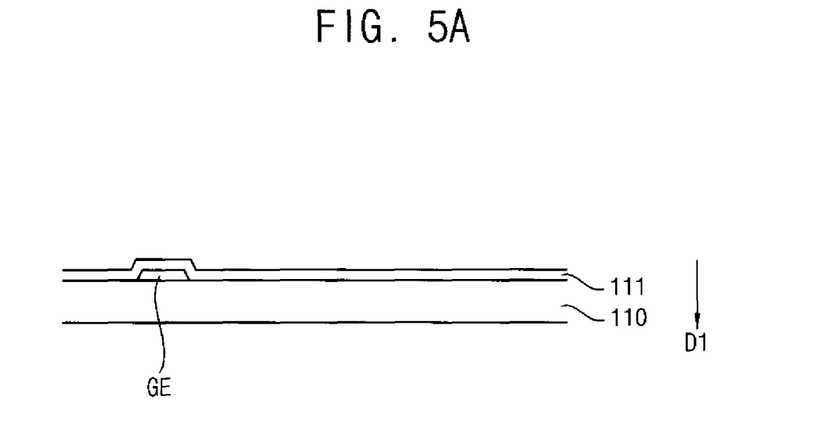
FIG. 5A, FIG. 5B, FIG. 5C, FIG. 5D, FIG. 5E, and FIG. 5F are cross-sectional views illustrating a method of manufacturing a display panel according to an exemplary embodiment of the present invention.

Referring to FIG. 5A, a gate electrode GE and a gate line (not shown) are formed on a substrate 110. A conductive layer (not shown) is formed and patterned into the gate electrode GE and the gate line by photolithography.

The method may further include oxidizing the conductive layer after patterning the conductive layer. Accordingly, the gate electrode GE and the gate line may include chromium oxide (Cr-oxide).

A gate insulating layer 111 is formed on the substrate 110 on which the gate electrode GE and the gate line are formed. The gate insulating layer 111 covers and insulates the gate electrode GE and the gate line.

Figure 5B:
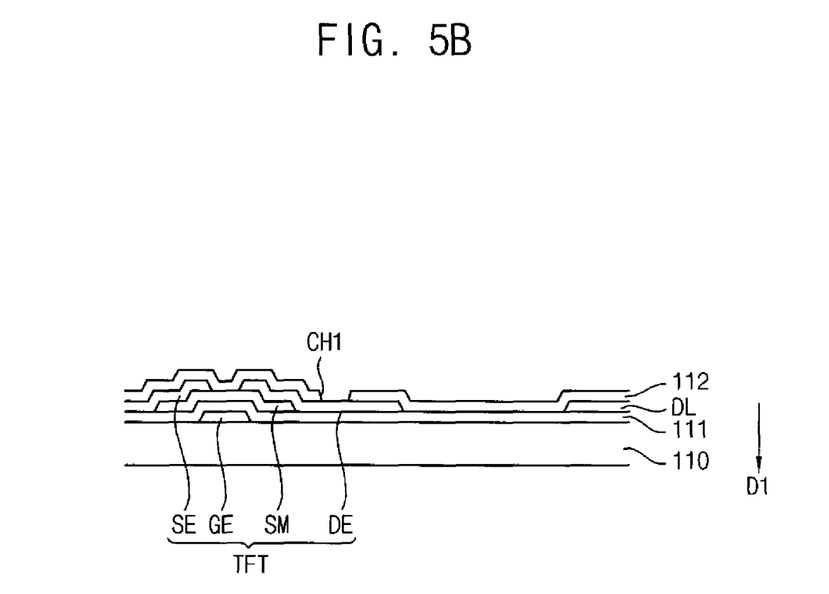

Referring to FIG. 5B, a semiconductor pattern SM is formed on the gate insulating layer 111. A data line DL, a source electrode SE and a drain electrode DE are formed on the gate insulating layer 111 on which the semiconductor pattern SM is formed. The semiconductor pattern SM, the gate electrode GE, the source electrode SE, and the drain electrode DE form a thin film transistor TFT.

The method may further include oxidizing the data line DL, the source electrode SE and the drain electrode DE after forming the data line DL, the source electrode SE and the drain electrode DE. Thus, the data line DL, the source electrode SE and the drain electrode DE may include chromium oxide (Cr-oxide)

A data insulating layer 112 is formed on the gate insulating layer 111 on which the semiconductor pattern SM, the data line DL, the source electrode SE and the drain electrode DE are formed. The data insulating layer 112 covers and insulates the thin film transistor TFT and the data line DL.

A first contact hole CH1 is formed through the data insulating layer 112. The first contact hole CH1 exposes a portion of the drain electrode DE.

Figure 5C:
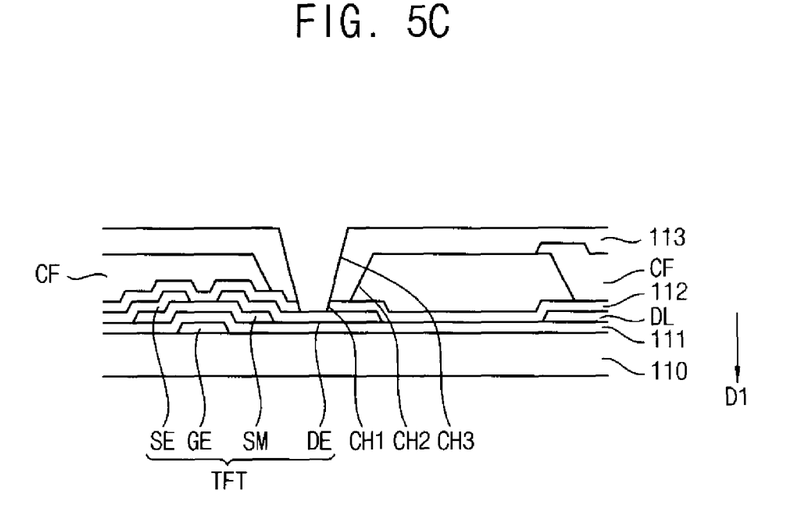

Referring FIG. 5C, a color filter CF is formed on the data insulating layer 112. A second contact hole CH2 is formed through the color filter CF, and overlaps a portion of the drain electrode DE and the first contact hole CH1.

The color filter CF may include a red color filter, a green color filter, and a blue color filter. The color filter CF may include organic macromolecule material. The color filter CF may be formed using photonasty macromolecule material via photolithography. The color filter CF may be formed via an inkjet process, etc.

Although the color filters CF are overlapped with each other at a boundary of the pixel area in the present exemplary embodiment, the color filters CF may have other configurations. For example, the color filters CF may be spaced apart from each other at the boundary of the pixel area. Each of the pixels includes the color filter CF. The color filters adjacent to each other may have different colors.

A first insulating layer 113 is formed on the color filters CF. A third contact hole CH3 is formed through the first insulating layer 113, and overlaps a portion of the drain electrode DE, the first contact hole CH1, and the second contact hole CH2.

Figure 5D:
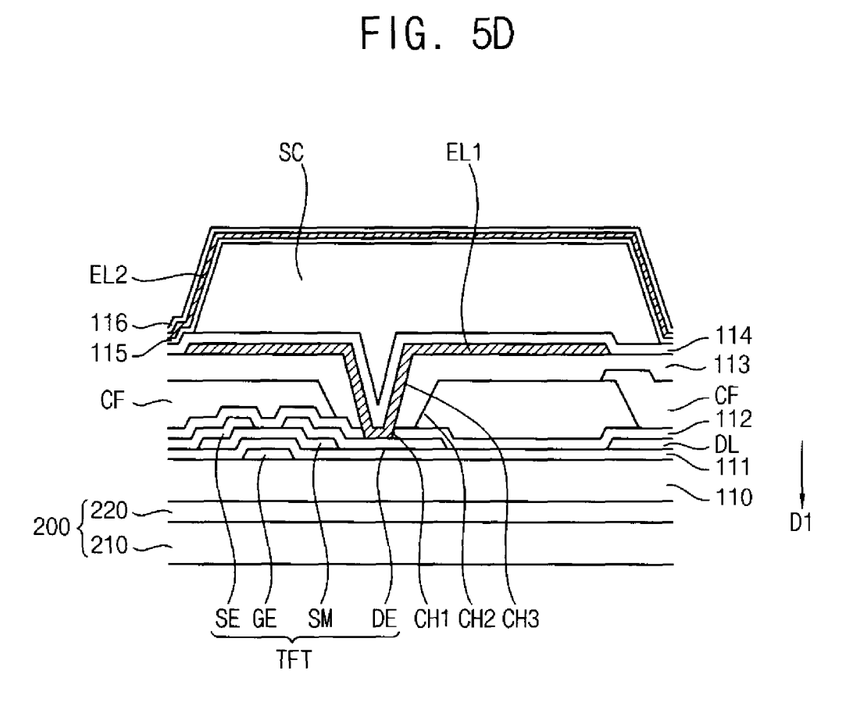

Referring FIG. 5D, a first electrode EL1 is formed on the first insulating layer 113. The first electrode EL1 may include a transparent conductive material, such as indium tin oxide (ITO), indium zinc oxide (IZO), etc. The first electrode EL1 is electrically connected to the drain electrode DE through the first contact hole CH1, the second contact hole CH2, and the third contact hole CH3.

A second insulating layer 114 is formed on the first insulating layer 113 on which the first electrode EL1 is formed. The second insulating layer 114 covers and insulates the first electrode EL1. The second insulating layer 114 includes inorganic insulating material, such as silicon nitride (SiNx), silicon oxide (SiOx) and etc.

A sacrificial layer SC is formed on the second insulating layer 114. The sacrificial layer SC corresponds to the pixel area. The sacrificial layer SC may include an organic macromolecule material, such as an organic material including benzocyclobutene (BCB) and acryl resin. The sacrificial layer SC may be formed via evaporation and an ashing process, or an evaporation and polishing process. In addition, the sacrificial layer SC may be formed via an inkjet process or a spin coating process, and is not limited thereto.

The sacrificial layer SC will be removed later to form a tunnel-shaped cavity, so that the sacrificial layer SC has dimensions the same as the tunnel-shaped cavity.

A third insulating layer 115 is formed on the second insulating layer 114 on which the sacrificial layer SC is formed. The third insulating layer 115 includes inorganic insulating material, such as silicon nitride (SiNx), silicon oxide (SiOx), etc.

A second electrode EL2 is formed on the third insulating layer 115. The second electrode EL2 may include a transparent conductive material, such as indium tin oxide (ITO), indium zinc oxide (IZO), etc. A transparent conductive layer (not shown) is formed, and the transparent conductive layer is patterned into the second electrode EL2 via photolithography.

A fourth insulating layer 116 is formed on the second electrode EL2.

Figure 5E:
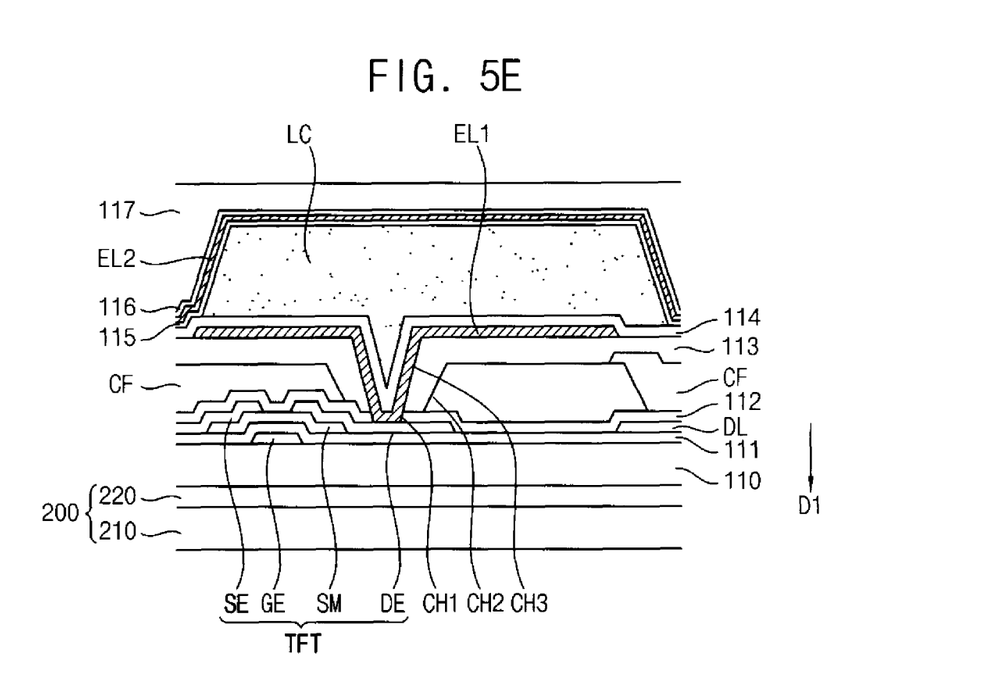

Referring to FIG. 5E, the tunnel-shaped cavity may be formed by selectively removing the sacrificial layer SC via a plasma process, for example. The sacrificial layer SC is at least partially etched via an anisotropic plasma etching process. Thereafter, a selective and anisotropic removal process is applied for selectively removing the material of the sacrificial layer SC while essentially not removing the surrounding other materials. Accordingly, a lower surface of the third insulating layer 115 and an upper surface of the second insulating layer 114 are exposed by way of the selective and anisotropic removal process. The lower surface of the third insulating layer 115 and the upper surface of the second insulating layer 114 are inner surfaces of the tunnel-shaped cavity. Here, removal of the sacrificial layer SC does not require that all traces of the sacrificial layer SC be removed.

The plasma process anisotropically removes an organic layer, such as microwave $O_2$ plasma, and is not limited thereto. Stage temperature and chamber pressure, using gas of the microwave $O_2$ plasma, may be adjusted to etch only organic insulating material. Accordingly, the second insulation layer 114 and the third insulation layer 115, including inorganic insulating material, are not etched. In the microwave $O_2$ plasma etching process, the stage temperature of an etching chamber may be about 100-300° C., the amount of $O_2$ flow may be about 5000-10000 sccm, the amount of diazene (N2H2) flow may be about 100-1000 sccm, the pressure of the etching chamber may be about 2 Torr, and the applied power supply may be about 100-4000 W.

An alignment layer (not shown) is formed in the tunnel-shaped cavity. Thus, the alignment layer is formed on the upper surface of the second insulation layer 114 and the lower surface of the third insulation layer 115. The alignment layer is formed using an alignment solution. The alignment solution may include a mixture of alignment material, such as polyamide, and proper solvent, such as polyamide. The alignment solution is supplied as a liquid, so that the alignment solution moves in the tunnel-shaped cavity as a result of capillary action. The alignment solution is supplied using an inkjet with a micro pipette, or by using vacuum injection equipment. After that, the solvent is removed. The substrate 110 may be stayed in a room temperature or heated to remove the solvent.

The alignment layer may be omitted according to type of the liquid crystal layer, or shapes of the first electrode EL1 and the second electrode EL2. For example, when the first electrode EL1 and the second electrode EL2 each have a specific pattern, the alignment layer may then be omitted.

An image displaying layer LC, including liquid crystal molecules, is formed in the tunnel-shaped cavity in which the alignment layer is formed. The liquid crystal molecules are supplied in a liquid form, so that the liquid crystal molecules move in the tunnel-shaped cavity due to capillary action. The liquid crystal layer LC may be supplied using an inkjet with a micro pipette, or by using vacuum injection equipment. Using the vacuum injection equipment, the hole is immersed into a container receiving the liquid crystal molecules, and then the pressure of a chamber in which the container is disposed is decreased. Thus, the liquid crystal molecules move in the tunnel-shaped cavity as a result of capillary action.

Figure 5F:
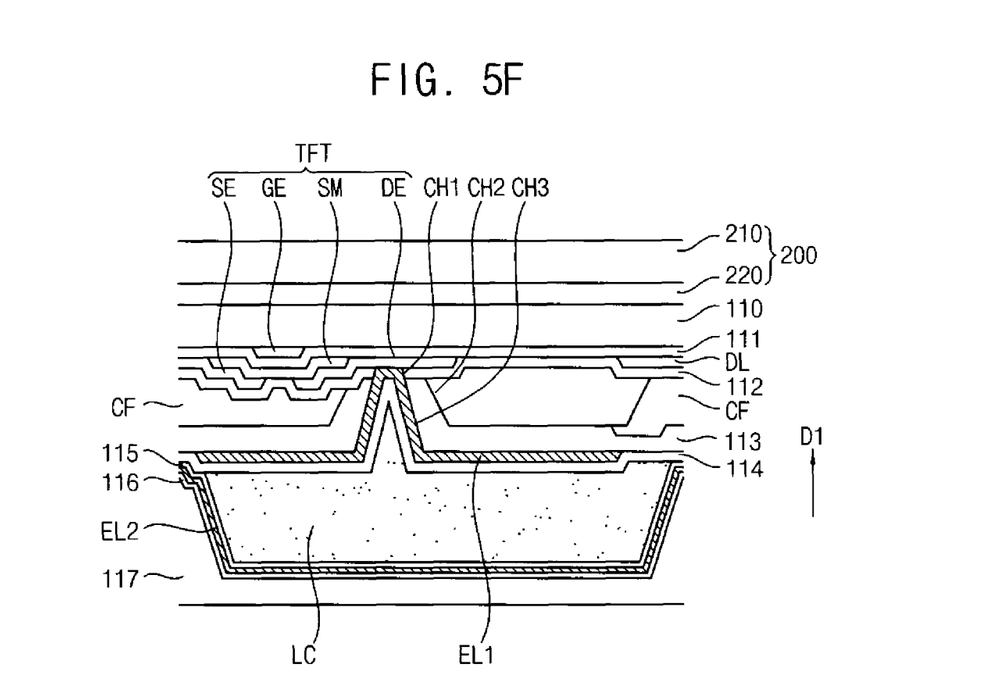

A protective layer 117 may be formed on the fourth insulating layer 116.

The protective layer 117 may include semi-hardening macromolecule material. The macromolecule material may have liquidity before hardening. The semi-hardening macromolecule material is formed to have a flat shape. Then the flat shaped semi-hardening macromolecule material is disposed on the display panel 100 and pressed to form the protective layer 117. The semi-hardening macromolecule material may be supplied to a recessed portion of the display panel 100 as a result of the liquidity.

Some insulating layers of the present exemplary embodiments may be omitted. For example, if the first electrode EL1 and the second electrode EL2 include specific material that may be protected from the plasma process used to remove the sacrificial layer SC, then the first insulating layer 113, the second insulating layer 114, the third insulating layer 115, and the fourth insulating layer 116 may be omitted.

After the protective layer 117 is formed, the substrate 110 is turned upside down with respect to the ground or otherwise configured to be substantially perpendicular to the ground. After that the upper polarizing plate 200 is attached on the substrate 110 in the first direction D1.

The upper polarizing plate 200 includes an upper polarizing layer 210 and an attachable-detachable layer 220 disposed between the upper polarizing layer 210 and the substrate 110. The attachable-detachable layer 220 may include a pressure sensitive adhesive.

The lower polarizing plate 300 is disposed over and spaced apart from the protective layer 117.

Figure 6:
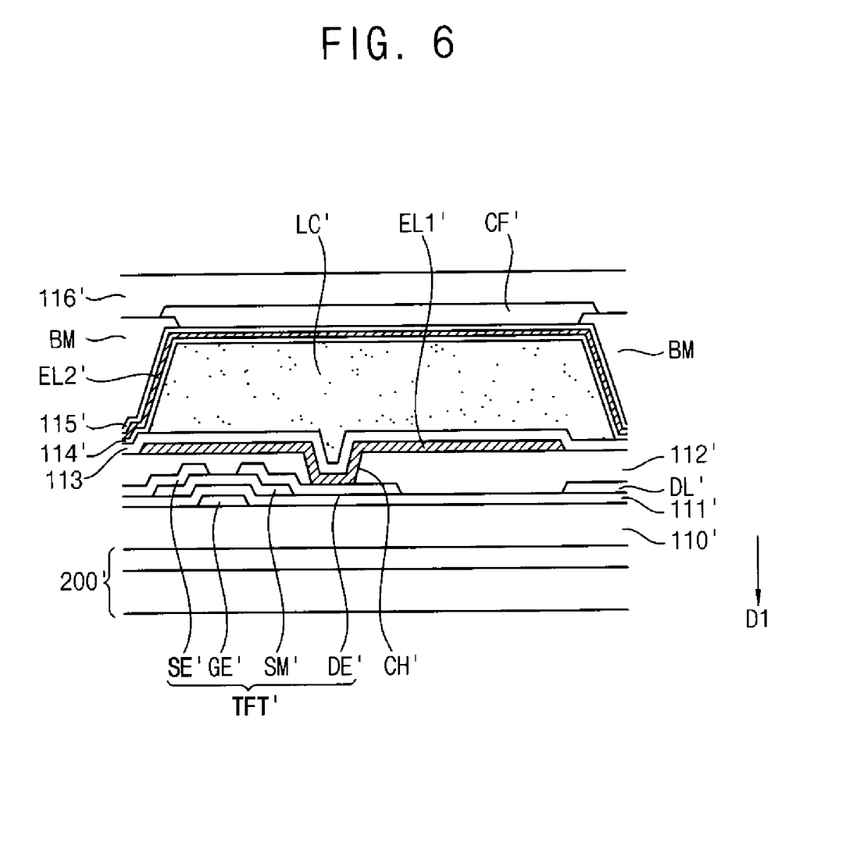
FIG. 6 is a cross-sectional view illustrating a display panel in a detailed explanation of an embedded microcavity (EM) layer.

FIG. 6 is a cross-sectional view illustrating a display panel 100 for detailed explanation of the EM layer.

The display panel 100 is substantially the same as the display panel 100 of FIG. 4 except for the color filter CF' and a black matrix BM. Thus, any further explanation will be omitted.

Referring to FIG. 6, the display panel 100 includes a substrate 110', a thin film transistor TFT', a gate insulating layer 111', a data insulating layer 112', a color filter CF', a first electrode EL1', a first insulating layer 113', an image displaying layer LC', a second insulating layer 114', a second electrode EL2', a third insulating layer 115', a black matrix BM, and a protective layer 116'.

A gate electrode GE' of the thin film transistor TFT' is disposed on the substrate 110'.

The gate insulating layer 111' is disposed on the gate line and the gate electrode GE'.

A semiconductor pattern SM' of the thin film transistor TFT' is disposed on the gate insulating layer 111' and overlaps the gate electrode GE'.

A source electrode SE' and a drain electrode DE' are disposed on the semiconductor pattern SM' and the gate insulating layer 111'. A data line DL' is disposed on the gate insulating layer 111'.

A contact hole CH' is formed through the data insulating layer 112'. The first electrode ELF is disposed on the data insulating layer 112'. The first electrode ELF is electrically connected to the drain electrode DE' through the contact hole CH'.

The first insulating layer 113' is disposed on the first electrode ELF. The image displaying layer LC' is dispose on the first insulating layer 113'. The image displaying layer LC' corresponds to each pixel area (not shown).

The second insulating layer 114' is disposed on the image displaying layer LC'. The second electrode EL2' is disposed on the second insulating layer 114'. The third insulating layer 115' is disposed on the second electrode EL2'. The black matrix BM is disposed between the image displaying layers LC' adjacent to each other. The black matrix BM is disposed on the third insulating layer 115'. The color filter CF' is disposed on the third insulating layer 115' on which the black matrix BM is formed. The protective layer 116' is disposed on the color filter CF'.

The upper polarizing plate 200' is disposed under the substrate 110'. Thus, the upper polarizing plate 200' is disposed in the first direction D1 with respect to the substrate 110'.

A lower polarizing plate 300 may be disposed over and spaced apart from the protective layer 116'.

Figure 7:
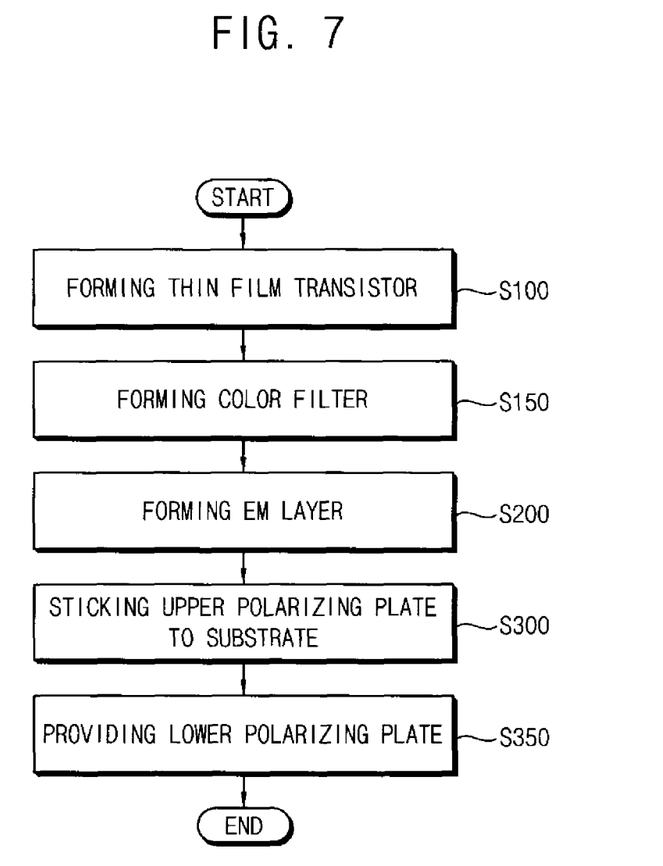
FIG. 7 is a flowchart illustrating a method of manufacturing a display apparatus according to an exemplary embodiment of the present invention.

FIG. 7 is a flowchart illustrating a method of manufacturing a display apparatus according to an exemplary embodiment of the present invention.

Referring to FIG. 7, the method includes forming a thin film transistor (S100), forming an EM layer (S200), and attaching an upper polarizing plate to a substrate (S300). The method may further include forming a color filter (S150), and providing a lower polarizing plate (S350). The display method according to the present exemplary embodiment uses substantially the same components as the display apparatus of 5A to 5F. Thus, any further detailed descriptions concerning the same elements will be omitted.

In forming the thin film transistor (S100), the thin film transistor is formed on a substrate.

In forming the EM layer (S200), the EM layer, which includes an image displaying layer formed using a tunnel-shaped cavity, is formed on the substrate on which the thin film transistor is formed.

Forming the EM layer (S200) includes forming a first insulating layer, disposing a sacrificial layer on the first insulating layer, disposing a second insulating layer on the sacrificial layer, forming the tunnel-shaped cavity by eliminating the sacrificial layer, and forming the image displaying layer corresponding to the tunnel-shaped cavity.

In sticking the upper polarizing plate to a substrate (S300), the upper polarizing plate is attached to the substrate opposite to the EM layer. The upper polarizing plate includes an upper polarizing layer and an attachable-detachable layer disposed between the upper polarizing layer and the substrate. The attachable-detachable layer may include a pressure sensitive adhesive. The substrate 110 may be turned upside down with respect to the ground or otherwise configured to be substantially perpendicular to the ground. Then, the upper polarizing plate is attached on the substrate by pressing the upper polarizing plate. The upper polarizing plate is directly attached to the substrate to prevent the EM layer from being damaged when the upper polarizing plate is detached from the substrate for reworking, In forming the color filter (S150), the color filter is formed on the substrate on which the thin film transistor is formed. The color filter (S150) may be formed between forming the thin film transistor (S100) and forming the EM layer (S200). In addition, the color filter may be formed over the EM layer after forming the EM layer (S200).

In providing the lower polarizing plate (S350), the lower polarizing plate is located over the substrate, so that the lower polarizing plate is spaced apart from the EM layer. The lower polarizing plate (S350) may be provided after sticking the upper polarizing plate to the substrate (S300). In addition, for manufacturing a reflective-type display apparatus, providing the lower polarizing plate (S350) may be eliminated.

According to exemplary embodiments of the present invention, the liquid crystal layer is formed by using the tunnel-shaped cavity, so that amount of liquid crystal and the number of substrates may be decreased.

In addition, the substrate is disposed toward an observer, so that reworking of upper polarizing plates is easy. Strength of the display panel 100 may be improved.

In addition, the lower polarizing plate is spaced apart from the protective layer, so that strength of the display panel 100 may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display panel comprising:
   a substrate comprising a switching element;
   a first electrode connected to the switching element;
   an image displaying layer disposed under the first electrode, the image displaying layer having a tunnel shape comprising side surfaces;
   a second electrode disposed on a lower surface and the side surfaces of the image displaying layer, the second electrode being insulated from the first electrode;
   a protective layer disposed under the second electrode, and the protective layer surrounds the lower surface and the side surfaces of the image displaying layer; and
   an upper polarizing plate disposed on the substrate, the upper polarizing plate contacting the substrate.

2. The display panel of claim 1, wherein the upper polarizing plate comprises an upper polarizing layer and an attachable-detachable layer attaching the upper polarizing layer to the substrate, and
   the attachable-detachable layer is disposed between the upper polarizing layer and the substrate.

3. The display panel of claim 2, wherein the attachable-detachable layer comprises a pressure sensitive adhesive.

4. The display panel of claim 1, further comprising a lower polarizing plate disposed under the protective layer,
   wherein the lower polarizing plate is spaced apart from the protective layer.

5. The display panel of claim 4, wherein the lower polarizing plate comprises a reinforcing layer configured to reinforce a strength of the lower polarizing plate, and a lower polarizing layer configured to polarize a light.

6. The display panel of claim 5, wherein the reinforcing layer comprises at least one selected from tri-acetyl cellulose, polycarbonate, poly propylene, olefin polymer, cyclo olefin polymer, and PMMA (polymethylmethacrylate).

7. The display panel of claim 5, wherein the reinforcing layer comprises a thickness of about 20 μm to about 300 μm.

8. The display panel of claim 4, wherein the lower polarizing plate comprises a reflective-type polarizing plate, the reflective-type polarizing plate configured to pass a portion of light that is polarized in a specific direction, and to reflect a remainder of the light.

9. The display panel of claim 1, wherein the switching element comprises a thin film transistor, the thin film transistor comprising a conductive pattern, and the conductive pattern comprises metal oxide.

10. The display panel of claim 9, wherein the conductive pattern comprises chromium oxide (Cr-oxide).

11. The display panel of claim 1, wherein the image displaying layer comprises liquid crystal.

12. The display panel of claim 1, wherein the substrate comprises plastic.

13. A display apparatus comprising:
    a display panel comprising:
      a substrate comprising a switching element;
      a first electrode connected to the switching element;
      an image displaying layer disposed under the first electrode, the image displaying layer having a tunnel shape comprising side surfaces;
      a second electrode disposed on a lower surface and the side surfaces of the image displaying layer, the second electrode being insulated from the first electrode;
      a protective layer disposed under the second electrode, the protective layer surrounding the lower surface and the side surfaces of the image displaying layer; and
      an upper polarizing plate disposed on the substrate, the upper polarizing plate contacting the substrate;
    a mold frame receiving the display panel; and
    a receiving container receiving the display panel and the mold frame.

14. The display apparatus of claim 13, wherein the mold frame comprises a first supporting portion supporting boundaries of the substrate and a second supporting portion supporting boundaries of the protective layer.

15. The display apparatus of claim 14, further comprising a reflecting plate disposed under the protective layer, the reflecting plate being spaced apart from the protective layer and received in the receiving container.

16. The display apparatus of claim 14, further comprising a lower polarizing plate disposed under the protective layer, the lower polarizing plate being spaced apart from the protective layer and received in the receiving container.

17. The display apparatus of claim 13, further comprising a backlight assembly disposed under the protective layer, the backlight assembly being spaced apart from the protective layer and received in the receiving container, the backlight assembly configured to generate a light sequentially passing through the image displaying layer and the substrate.

\* \* \* \* \*